US011488606B2

(12) United States Patent
Lesso

(10) Patent No.: US 11,488,606 B2
(45) Date of Patent: Nov. 1, 2022

(54) AUDIO SYSTEM WITH DIGITAL MICROPHONE

(71) Applicant: Cirrus Logic International Semiconductor Ltd., Edinburgh (GB)

(72) Inventor: John P. Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 111 days.

(21) Appl. No.: 17/163,845

(22) Filed: Feb. 1, 2021

(65) Prior Publication Data

US 2021/0264923 A1 Aug. 26, 2021

Related U.S. Application Data

(60) Provisional application No. 62/978,960, filed on Feb. 20, 2020.

(51) Int. Cl.
*G10L 17/02* (2013.01)
*G10L 25/78* (2013.01)
*H04R 3/00* (2006.01)

(52) U.S. Cl.
CPC .............. *G10L 17/02* (2013.01); *G10L 25/78* (2013.01); *H04R 3/005* (2013.01)

(58) Field of Classification Search
CPC ......... G10L 17/02; G10L 17/00; G10L 25/78; G10L 25/18; G10L 15/20; H04R 3/005; H04R 19/04; H04R 2410/00; G06F 21/32; G06F 21/83
See application file for complete search history.

(56) References Cited

U.S. PATENT DOCUMENTS

| 2007/0127761 A1* | 6/2007 | Poulsen | H03M 7/3015 381/355 |
| 2019/0261085 A1* | 8/2019 | Lesso | H04R 3/06 |
| 2020/0043484 A1* | 2/2020 | Lesso | G10L 21/0208 |

FOREIGN PATENT DOCUMENTS

| WO | 2019145708 A1 | 8/2019 | |
| WO | WO-2019145708 A1 * | 8/2019 | ............... G06F 1/32 |

OTHER PUBLICATIONS

International Search Report and Written Opinion of the International Searching Authority, International Application No. PCT/GB2021/050181, dated Apr. 26, 2021.

* cited by examiner

*Primary Examiner* — Yogeshkumar Patel
(74) *Attorney, Agent, or Firm* — Jackson Walker L.L.P.

(57) ABSTRACT

An audio system receives an audio signal from a digital microphone, which has an analog-digital converter with a controllable sampling rate. In response to a determination that a predetermined trigger phrase is not detected in the decimated audio signal, the sampling rate of the analog-digital converter in the digital microphone is controlled such that the audio signal has a first sample rate. In response to a determination that the predetermined trigger phrase is detected in the decimated signal, the sampling rate of the analog-digital converter in the digital microphone is controlled such that the audio signal has a second sample rate higher than the first sample rate, and the audio signal is applied to a spoof detection circuit, to determine whether the received signal contains live speech or replayed speech.

23 Claims, 7 Drawing Sheets

AUDIO SYSTEM WITH DIGITAL MICROPHONE

The present disclosure claims priority to United States Provisional Patent Application Ser. No. 62/978960, filed Feb. 20, 2020, which is incorporated by reference herein in its entirety.

TECHNICAL FIELD

Embodiments described herein relate to methods and devices for controlling an audio system that includes a digital microphone.

BACKGROUND

Many devices include microphones, which can be used to detect ambient sounds. In particular, many devices include digital microphones, in which a signal generated by an audio transducer is sampled in order to form a digital output audio signal.

Audio signals generated by microphones can be used in many ways. For example, audio signals representing speech can be used as the input to a speech recognition system, allowing a user to control a device or system using spoken commands. It is common to use speaker recognition systems in conjunction with speech recognition systems. A speaker recognition system can be used to verify the identity of a person who is speaking, and this can be used to control the operation of the speech recognition system.

As an illustration of this, a spoken command may relate to the personal tastes of the speaker. For example, the spoken command may be "Play my favourite music", in which case it is necessary to know the identity of the speaker before it is possible to determine which music should be played.

As another illustration, a spoken command may relate to a financial transaction. For example, the spoken command may be an instruction that involves transferring money to a specific recipient. In that case, before acting on the spoken command, it is necessary to have a high degree of confidence that the command was spoken by the presumed speaker.

One attempt to defeat a speaker recognition system is to record the speech of an enrolled user, and to play back that recorded speech so that it is detected by the speaker recognition system. It is therefore advantageous for the speaker recognition system to be able to determine whether speech that it has detected is recorded, rather than live. If it is able to determine that speech that it has detected is recorded, then it can take suitable action, such as deciding not to act on the received command.

It is known that many sound recording and playback systems are rather poor at reproducing frequencies that are outside the normal range of human hearing, for example in the ultrasound range. Therefore, it is known that live speech generally has more significant components in the ultrasound range than recorded speech.

SUMMARY

According to a first aspect of the invention, there is provided a method of operation of an audio system, the method comprising:
  receiving an audio signal from a digital microphone, wherein the digital microphone comprises an analog-digital converter having a controllable sampling rate;
  in response to a determination that first speech is present in the received audio signal:
    controlling the sampling rate of the analog-digital converter in the digital microphone such that the audio signal has a first sample rate; and
    applying said audio signal to a spoof detection circuit; and
  in response to a signal indicating that the first speech has ended in the received audio signal:
    controlling the sampling rate of the analog-digital converter in the digital microphone such that the audio signal has a second sample rate lower than the first sample rate.

According to a second aspect of the invention, there is provided an audio processing circuit, comprising:
  an input for receiving an audio signal from a digital microphone, wherein the digital microphone comprises an analog-digital converter having a controllable sampling rate;
  wherein the audio processing circuit is configured for:
  in response to a determination that first speech is present in the received audio signal:
    controlling the sampling rate of the analog-digital converter in the digital microphone such that the audio signal has a first sample rate; and
    applying said audio signal to a spoof detection circuit; and
  in response to a signal indicating that the first speech has ended in the received audio signal:
    controlling the sampling rate of the analog-digital converter in the digital microphone such that the audio signal has a second sample rate lower than the first sample rate.

According to a third aspect of the invention, there is provided a computer program product, comprising machine readable code containing instructions for causing an audio processing circuit to perform a method according to the first aspect.

BRIEF DESCRIPTION OF DRAWINGS

For a better understanding of the present invention, and to show how it may be put into effect, reference will now be made to the accompanying drawings, in which.

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

The methods described herein may be implemented in a wide range of devices and systems. However, for ease of explanation of one embodiment, an illustrative example will be described, in which the implementation occurs in a smartphone.

Figure 1:
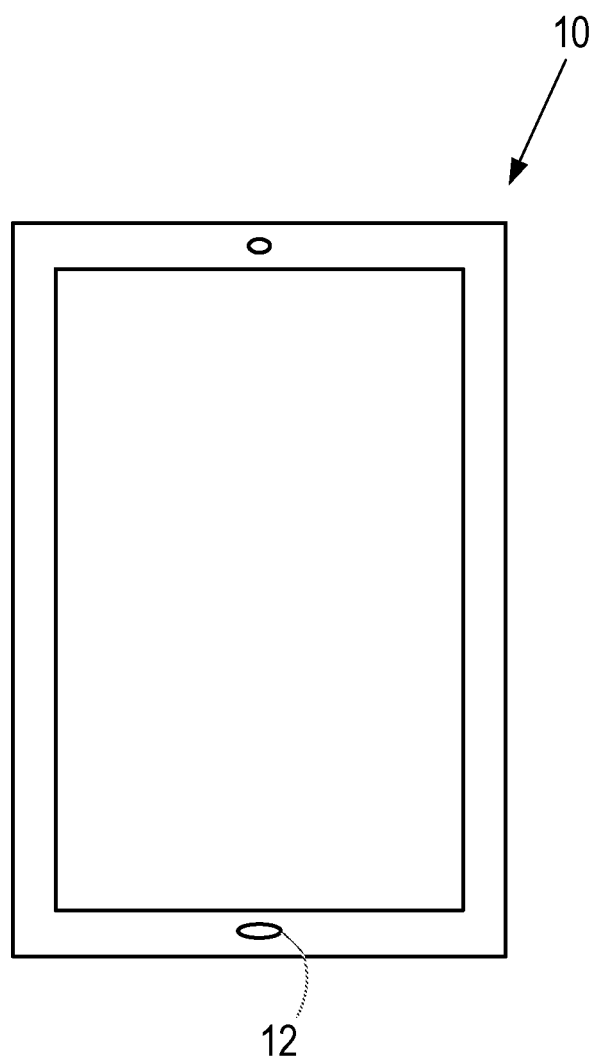
FIG. 1 illustrates an example smartphone.

FIG. 1 illustrates one example of a device in which the system may be embodied, namely a smartphone 10, having a microphone 12 for detecting ambient sounds. In normal use, the microphone is of course used for detecting the speech of a user who is holding the smartphone 10 close to their face.

Figure 2:
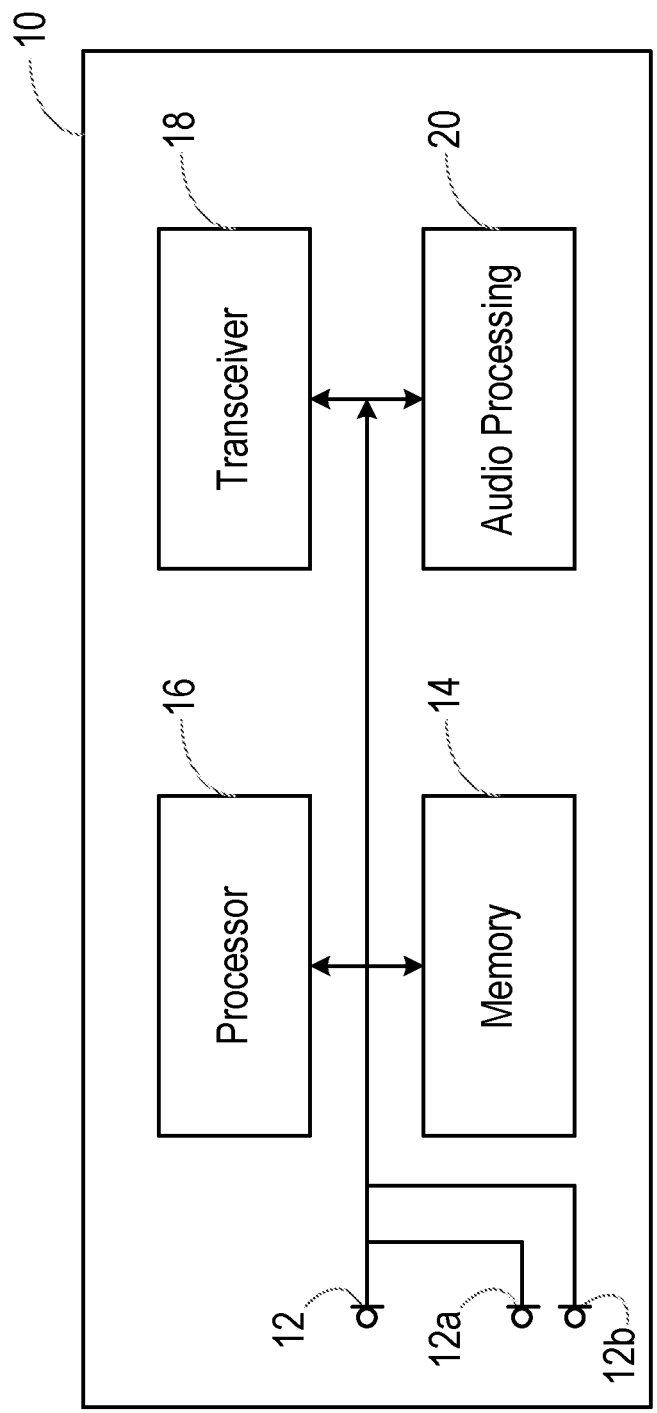
FIG. 2 is an example schematic diagram, illustrating the form of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of embodiments of the present disclosure.

Thus, FIG. 2 shows the microphone 12 mentioned above. In certain embodiments, the smartphone 10 is provided with multiple microphones 12, 12a, 12b, etc. As described in more detail below, the or each microphone may be a digital microphone, in which a signal generated by a transducer is applied to an analog-digital converter, in order to produce a digital audio output signal from the microphone.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

In this embodiment, the smartphone 10 is provided with voice biometric functionality, and with control functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the present disclosure relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device.

In other embodiments, a first part of the voice biometric functionality is performed on the smartphone 10 or other device that is located close to the user. Then, as described in more detail below, a signal may be transmitted using the transceiver 18 to a remote system, which performs a second part of the voice biometric functionality.

One attempt to defeat a voice biometric system is to record the speech of an enrolled user, and to play back that recorded speech so that it is detected by the speaker recognition system. This is referred to as a "replay attack" or as a "spoofing" attack. It is therefore advantageous for the speaker recognition system to be able to determine whether speech that it has detected is recorded, rather than live. If it is able to determine that speech that it has detected is recorded, then it can take suitable action, such as deciding not to act on the received command.

It is known that many sound recording and playback systems are rather poor at reproducing frequencies that are outside the normal range of human hearing, for example in the ultrasound range. Therefore, it is known that live speech generally has more significant components in the ultrasound range than recorded speech.

In order to be able to determine whether a received audio signal contains significant ultrasound components, the received audio signal must have a relatively wide bandwidth.

Therefore, in order to be able to detect ultrasound components in an audio signal that is received from a digital microphone, the digital microphone needs to operate with a sufficiently high sampling rate, that is, it needs to be clocked at a high enough rate, to ensure that the higher frequency components have been received. The digital microphone of a smartphone is generally required to operate in an "always-on" manner, so that the microphone is able to detect when a user speaks a trigger phrase that is used to activate certain functionality of the phone from a sleep state.

However, operating the digital microphone of a smartphone in an "always-on" manner, with the high sampling rate required to detect ultrasound components of the sound, would involve a relatively high power consumption that may be unacceptable, thus making it unattractive to detect replay attacks in this manner.

In accordance with embodiments described herein, it is proposed to adjust the clock rate of a digital microphone. For most of the time, the digital microphone is clocked at a relatively low rate, that has an acceptably low power consumption, but that is sufficient to recover speech from the detected audio signal. However, when it is determined that a trigger phrase has been spoken, the digital microphone clock rate is switched to a much higher speed, allowing the wide-bandwidth anti-spoofing detection process to be performed on the signal that is subsequently received, which may for example be the signal representing a command spoken following the trigger phrase.

Figure 3:
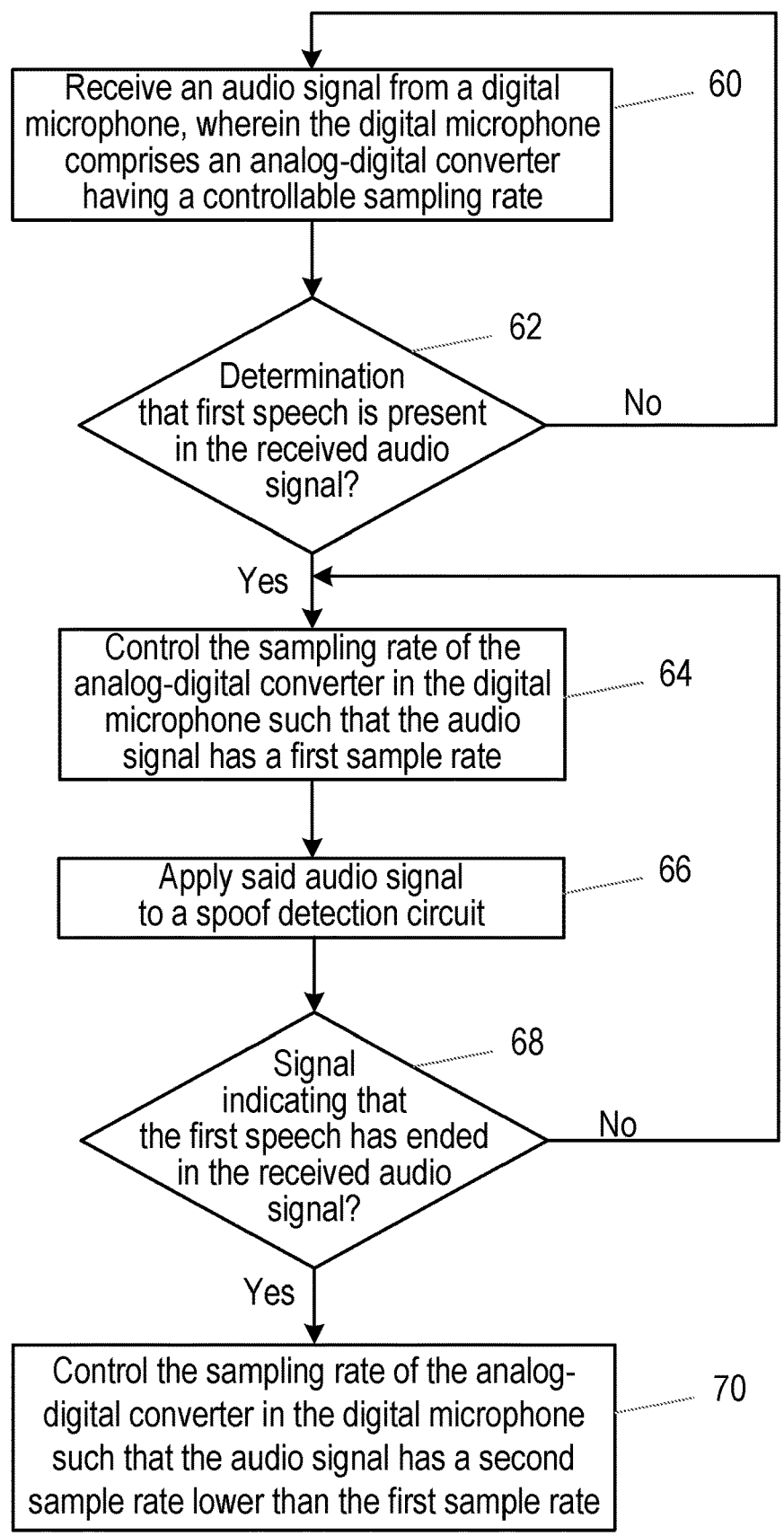
FIG. 3 is an example flow chart illustrating a method of analysing an audio signal.

FIG. 3 is a flow chart, illustrating a method of operation of an audio system. The method may be performed by a dedicated audio processing chip in the smartphone 10, or may be performed in one or more general purpose processing chip.

The method is performed continuously while the system is in operation. However, for convenience, FIG. 3 shows the method starting at a particular point in time, by performing step 60, namely receiving an audio signal from a digital microphone, wherein the digital microphone comprises an analog-digital converter having a controllable sampling rate.

During this phase, the sampling rate of the analog-digital converter may be a standard sampling rate, which is chosen to be sufficiently high that it is possible to detect speech in the resulting digital signal with a high degree of reliability, but is also chosen to be sufficiently low that the digital microphone can operate with this sampling rate in an always-on manner, without increasing the power consumption of the device to an unacceptable degree.

For example, the standard sampling rate may be in the range 200 kHz to 1 MHz, with 768 kHz or 800 kHz as typical values.

At step 62, a determination is made as to whether first speech is detected in the received audio signal. When the method is performed by a dedicated audio processing chip in the smartphone 10, the determination of step 62 may be performed in that dedicated audio processing chip, or may be performed in another audio processing chip, with a suitable indication being sent to the dedicated audio processing chip.

In some embodiments, the first speech may be any speech. In other embodiments, the first speech may be a predetermined trigger phrase.

If it was determined in step 62 that the first speech is not detected in the received audio signal, the method returns to step 60, and to monitor the received signal. If it was determined in step 62 that the first speech is present in the received audio signal, the method passes to step 64, in which the sampling rate of the analog-digital converter in the digital microphone is controlled such that the audio signal has a first sample rate.

The first sampling rate is chosen to be sufficiently high that it is possible to perform the wide-bandwidth anti-spoofing detection process described above to be performed on the signal that is subsequently received.

That is, the first sampling rate is chosen to be sufficiently high that it is possible to detect ultrasound components in the resulting digital signal with a high degree of reliability. Although this higher sampling rate increases the power consumption, the device will typically spend only a small fraction of the time operating with the higher sampling rate, so that it does not increase the overall power consumption of the device to an unacceptable degree.

For example, the first sampling rate may be in the range 1 MHz to 8 MHz, with 2.4 MHz or 4.8 MHz as typical values.

In step 66, the audio signal is applied to a spoof detection circuit, where the ultrasound components of the audio signal are examined, in order to determine whether it is likely that the received audio signal contains live speech, or whether it is likely that it represents speech that has been recorded and played back.

Meanwhile, in step 68, it is determined whether a signal is generated or received, indicating that the first speech has ended in the received audio signal. If it has not, the process returns to step 64. That is, the sampling rate of the analog-digital converter is maintained at the first sampling rate.

However, if it is determined at step 68 that the signal is generated or received, indicating that the first speech has ended in the received audio signal, the process passes to step 70, in which the sampling rate of the analog-digital converter in the digital microphone is controlled such that the audio signal has a second sample rate that is lower than the first sample rate. This second sampling rate may be the standard sampling rate mentioned above, in the range 200 kHz to 1 MHz, with 768 kHz or 800 kHz as typical values.

In addition, in certain embodiments of the method illustrated in FIG. 3, the received audio signal is applied to a controllable decimator to generate a decimated audio signal. In response to a determination that the first speech is detected in the audio signal, the decimator is controlled such that the decimated audio signal has a predetermined sample rate. In response to a determination that the first speech has ended, the decimator is controlled such that the decimated audio signal has the same predetermined sample rate.

Thus, regardless of whether a high sample rate signal is generated for use by the spoof detection block, a constant sample rate audio signal is also generated, and this audio signal can then be used for any suitable purpose, for example for speaker detection and/or speech detection processes, and/or for transmission over the telephone network when the device is being used to make a phone call.

This predetermined sample rate may be in the range 10 kHz to 60 kHz, with 16 kHz or 24 kHz as typical values.

Figure 4:
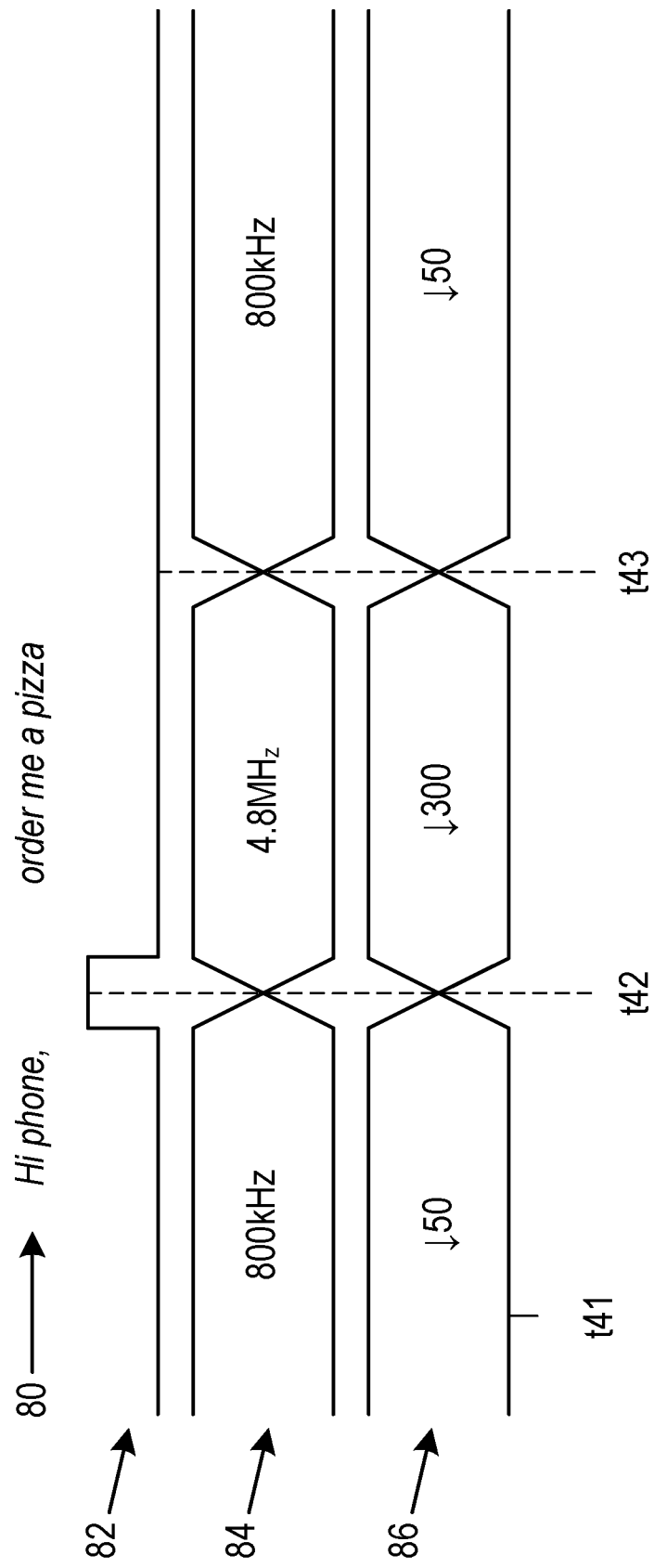
FIG. 4 illustrates the method of FIG. 3, in use.

FIG. 4 illustrates the operation of this system, in one embodiment.

Specifically, the top line 80 of FIG. 4 shows the words being spoken by a user; the second line 82 illustrates the output of a trigger phrase detection block; the third line 84 shows the sampling rate of the digital microphone; and the fourth line 86 illustrates the operation of the controllable decimator.

Thus, when the user starts speaking at time t41, the sampling rate of the analog-digital converter in the digital microphone is being controlled such that the output audio signal of the digital microphone is a 1-bit signal with the second sampling rate described with reference to FIG. 3. In this illustrated embodiment, the second sampling rate is 800 kHz.

In addition, the audio signal is being applied to a controllable decimator, which is operating with a decimation factor of 50, so that the decimated audio signal is a 16-bit or 24-bit signal with a sample rate of 16 kHz.

When it is determined at time t42 that the user has spoken a predetermined trigger phrase (in this case, "Hi phone") that is used to activate certain functionality of the phone, the sampling rate of the analog-digital converter in the digital microphone is controlled such that the output audio signal of the digital microphone is a 1-bit signal with the first sampling rate described with reference to FIG. 3. In this illustrated embodiment, the first sampling rate is 4.8 MHz.

This means that, when the user is speaking the command that follows the predetermined trigger phrase (in this case, "Order me a pizza"), a high bandwidth version of the relevant audio signal is available, and this can be used to perform any processes that are involved with detecting whether the detected speech is the result of a replay attack, for example by examining the ultrasound components of the received audio signal, but at least by examining components of the received audio signal at frequencies that could not be examined in detail from a version of the signal with the second sampling rate.

In addition, the controllable decimator is controlled, so that it starts operating with a decimation factor of 300, and so that the decimated audio signal remains a 16-bit or 24-bit signal with a sample rate of 16 kHz.

When it is determined at time t43 that the user has finished speaking, the sampling rate of the analog-digital converter in the digital microphone is controlled such that the output audio signal of the digital microphone reverts to the second sampling rate described with reference to FIG. 3, namely 800 kHz in this illustrated embodiment. In addition, as before, the controllable decimator is controlled such that it operates with a decimation factor of 50, so that the decimated audio signal remains a 16-bit or 24-bit signal with a sample rate of 16 kHz.

In an additional mode of operation, in some embodiments, the microphone may be clocked at a rate that is even slower than the second sampling rate while there is no audible speech, in order to reduce the power consumption still further.

In these embodiments, the method of FIG. 3 further comprises attempting to detect any speech in the decimated audio signal. When no speech is detected in the decimated audio signal, the sampling rate of the analog-digital converter in the digital microphone is controlled such that the audio signal has a third sample rate that is lower than the second sample rate.

The third sampling rate is chosen to be sufficiently high that it is possible to detect the presence of speech in the resulting digital signal with a high degree of reliability, but is also chosen to be sufficiently low that the digital microphone can operate with this sampling rate in an always-on manner, without increasing the power consumption of the device to an unacceptable degree.

For example, the third sample rate may be in the range 50 kHz to 400 kHz.

As before, when the sampling rate of the analog-digital converter in the digital microphone is controlled such that the audio signal has the third sample rate, the controllable decimator is controlled such that the decimated audio signal still has the predetermined sample rate.

In this case, when speech is not detected in the decimated audio signal, the audio signal may be filtered before application to the controllable decimator.

Figure 5:
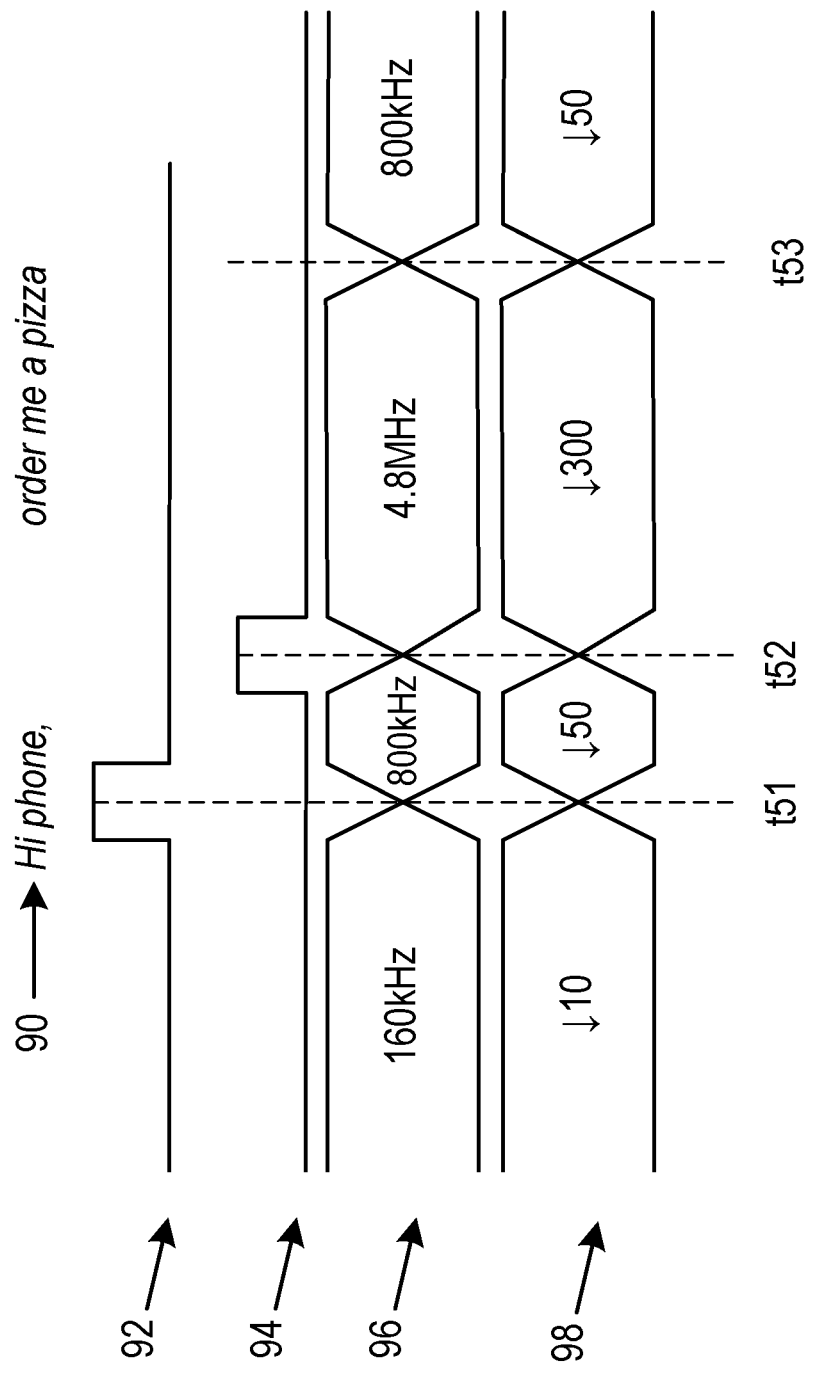
FIG. 5 illustrates a further method, in use.

FIG. 5 illustrates the operation of these embodiments of the system.

Specifically, the top line 90 of FIG. 5 shows the words being spoken by a user; the second line 92 illustrates the output of an activity detection block; the third line 94 illustrates the output of a trigger phrase detection block; the fourth line 96 shows the sampling rate of the digital microphone; and the fifth line 98 illustrates the operation of the controllable decimator.

In this case, until the user starts speaking at time t51, the sampling rate of the analog-digital converter in the digital microphone is being controlled such that the output audio signal of the digital microphone has the third sampling rate described above. In this illustrated embodiment, the third sampling rate is 160 kHz.

In addition, the audio signal is being applied to a controllable decimator, which is operating with a decimation factor of 10, so that the decimated audio signal is a 16-bit or 24-bit signal with a sample rate of 16 kHz.

Then, when the start of the user's speech is detected at time t51, the sampling rate of the analog-digital converter in the digital microphone is controlled such that the output audio signal of the digital microphone has the second sampling rate described with reference to FIG. 3. In this illustrated embodiment, the second sampling rate is 800 kHz.

In addition, the controllable decimator, to which the audio signal is being applied, is controlled to operate with a decimation factor of 50, so that the decimated audio signal remains a 16-bit or 24-bit signal with a sample rate of 16 kHz.

When it is determined at time t52 that the user has spoken a predetermined trigger phrase (in this case, "Hi phone") that is used to activate certain functionality of the phone, the sampling rate of the analog-digital converter in the digital microphone is controlled such that the output audio signal of the digital microphone has the first sampling rate described with reference to FIG. 3. In this illustrated embodiment, the first sampling rate is 4.8 MHz.

This means that, when the user is speaking the command that follows the predetermined trigger phrase (in this case, "Order me a pizza"), a high bandwidth version of the relevant audio signal is available, and this can be used to perform any processes that are involved with detecting whether the detected speech is the result of a replay attack, for example by examining the ultrasound components of the received audio signal, but at least by examining components of the received audio signal at frequencies that could not be examined in detail from a version of the signal with the second sampling rate.

In addition, the controllable decimator is controlled, so that it starts operating with a decimation factor of 300, and so that the decimated audio signal remains a 16-bit or 24-bit signal with a sample rate of 16 kHz.

When it is determined at time t53 that the user has finished speaking, the sampling rate of the analog-digital converter in the digital microphone is controlled such that the output audio signal of the digital microphone reverts to the second sampling rate described with reference to FIG. 3, or to the third sampling rate.

In addition, as before, the controllable decimator is controlled so that the decimated audio signal remains a 16-bit or 24-bit signal with a sample rate of 16 kHz.

Figure 6:
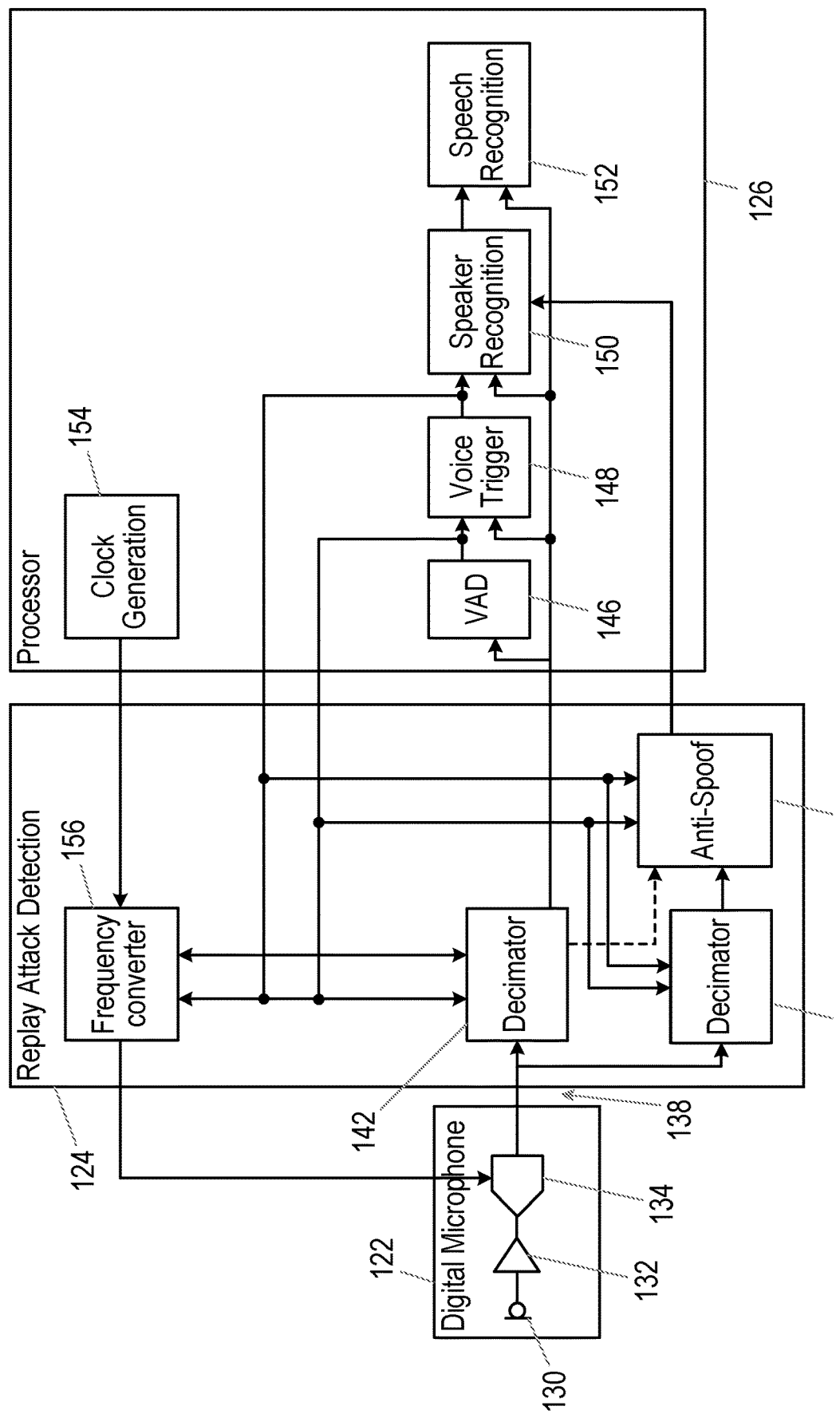
FIG. 6 is a first example block diagram illustrating an audio system including a digital microphone.

FIG. 6 is a block diagram illustrating functional blocks in the audio processing system.

Specifically, FIG. 6 shows a system 120, which includes a digital microphone circuit 122, a separate circuit 124 for performing actions associated with detecting a replay attack on a voice biometric system, and a processor 126. When the system 120 forms part of a smartphone, tablet computer, smart speaker, or the like, the processor 126 may for example be an applications processor or a codec.

In a system as shown in FIG. 2, the digital microphone circuit 122 may correspond to one of the microphones 12, 12a, 12b shown in FIG. 2; the processor 126 may correspond to the processor 16 (for example the applications processor of the smartphone 10) or the audio processing circuitry 20; and the replay attack detection circuitry circuit 124 may be provided as part of the processor 16 or the audio processing circuitry 20, or may be provided as a separate circuit to which the relevant one of the microphones 12, 12a, 12b is connected.

The digital microphone circuit 122 includes a microphone transducer 130, a suitable pre-amplifier 132, and an analog-digital converter 134. The sampling rate of the analog-digital converter 134, and hence the sample rate of a digital signal output from the digital microphone circuit 122 at an output 136, are controllable, as discussed in more detail below.

The control of the sampling rate of the analog-digital converter 134, as mentioned above, may be achieved by sending the required clock signal from the circuit 124 to the digital microphone circuit 122, for example when the interface 138 between the circuit 124 and the digital microphone circuit 122 is a 2-pin interface. Alternatively, when the interface 138 is an interface allowing more detailed control, for example a MIPI Soundwire™ interface, a control signal indicating the intended sampling rate may be sent from the circuit 124 to the digital microphone circuit 122.

The circuit 124 receives the digital signal that is output from the digital microphone circuit 122.

The digital signal that is received by the circuit 124 from the digital microphone circuit 122 may be a 1-bit digital signal having a sample rate that results in oversampling of the signal to be detected. For example, in the case of an audio processing device, where the maximum frequency of interest may for example be in the region of 8 kHz-20 kHz, the sample rate of the received signal may be very much higher than the Nyquist sampling rate, which is twice the upper frequency of interest.

The received signal is applied to a first decimator 142, which has a variable decimation rate M. The decimation rate applied by the first decimator 142 is controlled such that, regardless of the sample rate of the digital signal that is received from the digital microphone circuit 122, the signal that is output from the circuit 124 on the output line 144 has a consistent sample rate. This sample rate is chosen such that the output audio signal can be used in any desired audio process. For example, the received 1-bit digital signal may be converted to a 16-bit, 24-bit, or 32-bit digital signal having a sample rate of 16 kHz, which may be suitable for audio signal processing purposes.

In this illustrated embodiment, the signal that is output from the decimator 142 is passed to the processor 126. Specifically, in the first instance, the signal that is output from the decimator 142 is passed to a voice activity detection (VAD) block 146, which uses conventional techniques to detect the presence of speech in the decimated signal.

When the voice activity detection (VAD) block 146 detects the presence of speech in the decimated signal, it sends a signal to activate a voice trigger detection block 148, which also receives the signal output from the decimator 142.

The voice trigger detection block 148 then uses conventional techniques to detect the presence of a signal representing a predetermined voice trigger in the decimated signal. Although FIG. 6 shows the voice activity detection block 146 and the voice trigger detection block 148 as separate blocks, the voice activity detection may be included as a function of the voice trigger detection block 148.

Although FIG. 6 shows an embodiment in which the voice activity detection block 146 and the voice trigger detection block 148 are functions of the processor 126, in other embodiments the voice activity detection block 146 and/or the voice trigger detection block 148 may be provided on the circuit 124.

It should also be noted that, in some embodiments, the 1-bit digital signal that is received by the circuit 124 from the digital microphone circuit 122 may also be provided as an output of the circuit 124, allowing the circuit 124 to be used with downstream devices that are configured to receive a 1-bit digital signal as their input.

The signal output from the decimator 142 may also be supplied to a speaker recognition block 150 and/or a speech recognition block 152. The speaker recognition block 150 and the speech recognition block 152 may be provided on the circuit 124. However, in this illustrated embodiment, the speaker recognition block 150 and the speech recognition block 152 are provided separate from the circuit 124, in the processor 126.

In this illustrated embodiment, the speaker recognition block 150 is controlled by a signal from the voice trigger detection block 148. Thus, when it is determined that the predetermined trigger phrase has been spoken, the speaker recognition block 150 is activated.

The speaker recognition block 150 may be configured to determine whether speech that is contained in the received signal was uttered by an identified enrolled user. For example, the speaker recognition block 150 may be configured to determine whether the speech that is contained in the received signal has features that are sufficiently similar to a model that has been generated for that user during an enrolment process.

The speech recognition block 152 may be configured to identify the content of the speech in the received signal, that is the meaning of the speech. In some embodiments, the speech recognition block 152 may be activated only when the speaker recognition block 150 has determined that the speech was uttered by an identified enrolled user. In other embodiments, or in other use cases, the actions that are performed in response to the identified speech content will vary, depending on the identity of the speaker, as determined by the speaker recognition block 150.

In addition, in the illustrated embodiment, the processor 126 includes a clock generator circuit 154, which may generate a clock signal itself, or may receive a clock signal from another circuit. A clock signal generated by the clock generator circuit 154 is passed to the circuit 124, and specifically to a frequency conversion circuit 156. In this embodiment, the output of the frequency conversion circuit 156 is supplied to the digital microphone circuit 122 to act as the sampling rate clock of the analog-digital converter 134. The operation of the frequency conversion circuit 156 is described in more detail below.

There is thus described a system in which a signal that is detected by a microphone can be used in a speaker recognition process. It is known that a speaker recognition process may be vulnerable to a replay attack, in which the speech of an enrolled user is recorded and replayed. In the event of such an attack, the speaker recognition process may determine that the replayed speech is the speech of the enrolled user, and may therefore act on any command given by the speaker.

This is particularly true in the case of a system that relies on the use of a voice trigger, that is, a predetermined wake phrase that must be spoken by the user to activate the system. In such a system, the enrolled user will probably speak that predetermined wake phrase quite often, giving more opportunities for a third party to record the enrolled user speaking that phrase. The attacker can then replay the user speaking the predetermined wake phrase in order to activate the system and to be authorised, and the attacker can then speak a command for their own benefit, with a high probability that the speaker recognition system will still recognise the whole of the speech as the speech of the enrolled user.

In order to defend against this sort of replay attack, it is useful to be able to recognise whether received speech is live speech, or whether it has been recorded and replayed. As noted above, the process of recording and replaying speech using widely available equipment causes high frequency components of the speech to be lost. In particular, frequencies in the upper part of the audio frequency range, and/or in the ultrasound range, may be lost.

Similarly, one issue with the sort of system shown in FIG. 6 is that the system may be accidentally activated. For example, in the case of a smart speaker device that is intended to respond to a user's spoken commands, the device may be activated by speech from a radio or television in the same room as the smart speaker device. Although the speaker recognition function should identify that this speech is not the speech of the enrolled user, activation of the speaker recognition function increases the power consumption of the device. Therefore, in such a system, it is advantageous to be able to recognise whether speech is live speech or replayed speech, and to activate the speaker recognition process only when live speech is detected. Again, it is relevant that speech played through a radio or television will typically be deficient in the expected high frequency components of live speech.

In the embodiment illustrated in FIG. 6, a received speech signal is passed to an anti-spoof block 160, which attempts to determine whether the received speech is live speech, or speech that has been recorded and replayed. The speaker recognition block 150 then receives a control input from the anti-spoof block 160. Thus, in the embodiment shown in FIG. 6, the speaker recognition block 150 may be configured to determine whether speech that is contained in the received signal was uttered by the identified enrolled user, only when the anti-spoof block 160 has determined that it is probable that the received signal represents live speech. As an alternative, outputs from the speaker recognition block 150 and the anti-spoof block 160 may be combined to generate a single output indicating whether the speech in the received signal should be regarded as the live speech of the enrolled user.

In an initial condition, the sampling rate of the analog-digital converter 134 may be controlled to be the standard sampling rate described with reference to FIGS. 3, 4 and 5, which may for example be in the region of 800 kHz.

In one illustrative example, the clock generator 154 generates a clock signal with a frequency of 768 kHz, and passes this to the frequency converter 156. In this mode, the sample rate converter is transparent, and passes the 768 kHz clock signal to the digital microphone circuit 122.

This 768 kHz clock signal means that the analog-digital converter 134 generates a 1-bit output signal with the sample rate of 768 kHz.

The 1-bit signal with the sample rate of 768 kHz is passed to the decimator 142, where it is converted to a 24-bit (or 16-bit, or 32-bit) signal, with a sample rate of 16 kHz (that is ⅟₄₈ of 768 kHz), and it is this signal that is used for the purposes of voice activity detection, trigger phrase detection, speaker recognition, and/or speech recognition. Because it has a sample rate of 16 kHz, this signal has an effective bandwidth of 8 kHz.

The process of spoof detection is triggered either when the voice activity detection block 146 detects speech in the received signal and generates a suitable output signal, or when the voice trigger detection block 148 detects the trigger phrase in the received signal and generates a suitable output signal.

In this event, the clock generator 154 still generates a clock signal with a frequency of 768 kHz, and passes this to the frequency converter 156. In this mode, in response to a signal from the voice activity detection block 146 or from the voice trigger detection block 148, the sample rate converter acts to increase the frequency of the clock signal, and passes the increased frequency clock signal to the digital microphone circuit 122.

In one illustrative example, the frequency converter 156 increases the frequency of the clock signal by a factor of 6, that is, to 4.608 MHz.

This 4.608 MHz clock signal means that the analog-digital converter 134 generates a 1-bit output signal with the sample rate of 4.608 MHz.

In this mode, the decimator 142 also receives a control signal from the voice activity detection block 146, or the voice trigger detection block 148, indicating that it will receive a signal having a higher sample rate. Because it is useful for the circuit 124 to generate a 16 kHz signal in all modes, this requires the decimation factor of the decimator 142 to increase when the input signal has a higher sample rate. In the embodiment in which the frequency converter 156 increases the frequency of the clock signal by a factor of 6, the decimation factor must also increase by a factor of 6, that is, to 288.

Thus, in this mode, the 1-bit signal with the sample rate of 4.608 MHz is passed to the decimator 142, where it is converted to a 24-bit (or 16-bit, or 32-bit) signal, with a sample rate of 16 kHz, and it is this signal that is used for the purposes of voice activity detection, trigger phrase detection, speaker recognition, and/or speech recognition.

In this mode, a second decimator 162 also receives the control signal from the voice activity detection block 146, or the voice trigger detection block 148, indicating that it should be active.

Thus, in this mode, the 1-bit signal with the sample rate of 4.608 MHz is also passed to the second decimator 162, where it is converted to a 24-bit (or 16-bit, or 32-bit) signal, with a sample rate of 48 kHz. Thus, this signal has an effective bandwidth of 24 kHz. The output signal of the second decimator 162 is passed to the anti-spoof block 160.

FIG. 6 shows the first decimator 142 and the second decimator 162 as separate blocks, but it is also possible that the decimator 142 could perform a first partial decimation to reduce the sample rate (for example to 48 kHz) to allow the signal to be used for spoof detection, replacing the second decimator 162, and could then perform a second partial decimation to reduce the sample rate (for example to 16 kHz) before the signal is output.

The higher sample rate signal allows wide bandwidth spoofing to be performed. More specifically, the anti-spoof block 160 examines features of the received signal, and still more specifically the anti-spoof block 160 examines features of the received signal in the ultrasound frequency range, or at least in higher frequencies that would generally not be detectable in the signal having the first sample rate. Examples of techniques that may be used are: comparing the frequency spectrum of received speech with an expected frequency spectrum, based on the acoustic class of the speech at that time (as described in International Patent Application No. PCT/GB2019/052143); and comparing the respective degrees of modulation of components of a speech signal in different frequency bands, which may include an ultrasound frequency band (as described in U.S. Provisional Patent Application No. 62/938,377).

The operation of the anti-spoof block 160 is therefore to determine whether it is probable that the received signal represents live speech, or whether it is probable that the received signal represents recorded speech that has been played back through a sound reproduction system.

When the signal received from the voice activity detection block 146, or from the voice trigger detection block 148, indicates that the speech, or the trigger phrase, has ended, the frequency converter block 156 may be controlled so that the clock signal sent to the microphone circuit 122 to act as the sampling clock for the analog-digital converter 134 reverts to the standard frequency (that is, 768 kHz, for example) discussed above.

In one embodiment, the frequency converter block 156 is configured such that it can generate a clock signal with a third frequency, that can be used by the analog-digital converter 134 to generate a signal with a third sample rate.

For example, in this embodiment, the frequency converter block 156 is configured such that it generates a clock signal with the third frequency, and hence that the analog-digital converter 134 generates a signal with a third sample rate, when there is no speech present in the decimated signal.

During the trigger phrase, the frequency converter block 156 generates a clock signal with the higher frequency mentioned above, and hence the analog-digital converter 134 generates a signal with the higher sample rate (for example 4.608 MHz).

When there is other speech present in the decimated signal, that is, speech that is not the trigger phrase, the frequency converter block 156 generates a clock signal with the standard frequency mentioned above, and hence the analog-digital converter 134 generates a signal with the standard sample rate (for example 768 kHz).

In such an embodiment, the third sample rate may for example be 160 kHz. The 1-bit signal with the sample rate of 160 kHz is passed to the decimator 142, where it is converted to a 24-bit (or 16-bit, or 32-bit) signal, with a sample rate of 16 kHz (that is $\frac{1}{10}$ of 160 kHz). This signal may not be suitable for processes such as speaker recognition or speech recognition, but it may be used for the purposes of voice activity detection and trigger phrase detection.

When the sample rate of the received signal is so low, a band-pass filter in the decimator 142 may be activated, in order to remove sigma-delta noise arising from the operation of the analog-digital converter 134.

FIG. 6 illustrates an embodiment in which the processor 126 may be a codec, which is configured to process signals before passing them to an applications processor.

Figure 7:
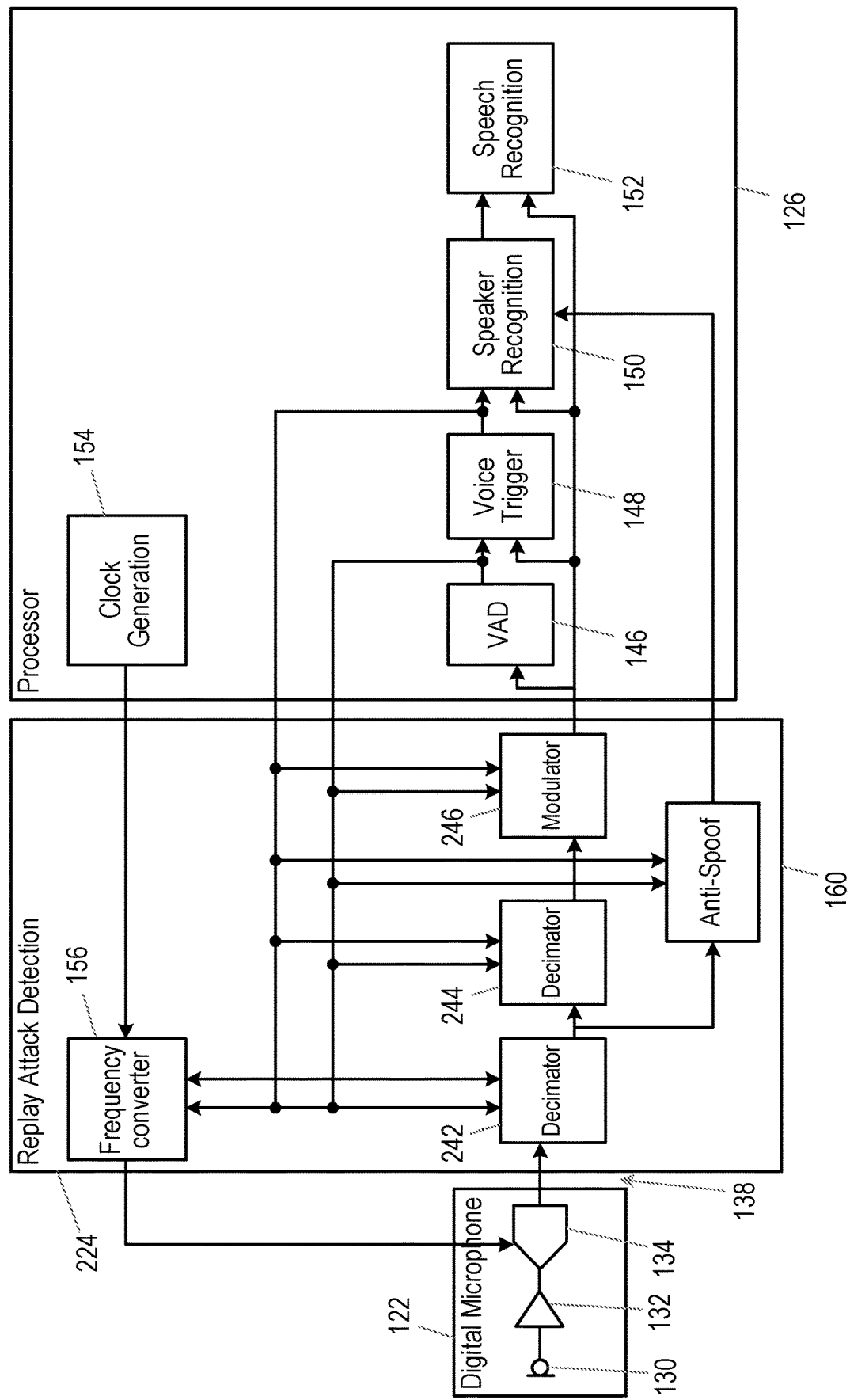
FIG. 7 is a second example block diagram illustrating an audio system including a digital microphone.

FIG. 7 illustrates an alternative embodiment, in which the replay attack detection circuit is essentially in-line between the microphone circuit 122 and the applications processor 126, and is transparent to the applications processor 126. That is, the applications processor is able to behave as if the replay attack detection circuit were not there.

In FIG. 7, the replay attack detection circuit 224 is very similar to the replay attack detection circuit 124 shown in FIG. 6, and features having the same reference numerals behave in the same way.

Thus, the frequency converter circuit 156 receives a clock signal from the clock generator 154, for example at 768 kHz, and can be controlled to generate a clock output at the same frequency, or at a higher frequency, for example 4.608 MHz.

The signal received from the digital microphone 122, having a sample rate that depends on the clock frequency supplied by the frequency converter circuit 156, is passed to a first decimator 242.

When the frequency converter circuit 156 is supplying a clock signal at a higher frequency, the first decimator 242 converts the 4.608 MHz 1-bit signal received from the microphone block 122 to a 96 kHz 24-bit signal, which is passed to the anti-spoof block 160.

The output of the first decimator 242 is also passed to a second decimator 244, which converts the 96 kHz 24-bit signal to a 16 kHz 24-bit signal. The output of the second decimator 244 is passed to a sigma-delta modulator 246, which converts the 16 kHz 24-bit signal to a 1-bit 768 kHz signal for sending to the applications processor 126.

When the clock and data have the standard 768 kHz clock frequency/sample rate, the first decimator 242, the second decimator 244, and the sigma-delta modulator 246 are switched out of the signal path, and the 1-bit 768 kHz signal received from the digital microphone 122 is passed straight through to the applications processor 126. In addition, the anti-spoof block 160 is deactivated.

Thus, the applications processor 126 receives the 1-bit 768 kHz signal, regardless of what signal is generated by the microphone block 122.

FIG. 7 shows the frequency converter circuit 156, the first decimator 242, the second decimator 244, the sigma-delta modulator 246, and the anti-spoof block 160 being controlled based on a signal generated by a voice activity detection block 146 and/or voice trigger detection block 148 in the applications processor 126. In other embodiments, the voice activity detection block 146 and/or the voice trigger detection block 148 may be provided instead within the replay attack detection circuit 224.

There is thus described a system in which an anti-spoof block can take into account artefacts that appear in the upper part of the audible frequency range, or in the ultrasound frequency range, without requiring a digital microphone to operate all the time in a high power mode with a high sampling rate.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A method of operation of an audio system, the method comprising:
receiving an audio signal from a digital microphone, wherein the digital microphone comprises an analog-digital converter having a controllable sampling rate;
in response to a determination that first speech is present in the received audio signal:
controlling the sampling rate of the analog-digital converter in the digital microphone such that the audio signal has a first sample rate; and
applying said audio signal to a spoof detection circuit; and
in response to a signal indicating that the first speech has ended in the received audio signal:
controlling the sampling rate of the analog-digital converter in the digital microphone such that the audio signal has a second sample rate lower than the first sample rate.

2. A method according to claim 1, wherein said first speech comprises any speech.

3. A method according to claim 1, wherein said first speech comprises a predetermined trigger phrase.

4. A method according to claim 1, further comprising:
applying said audio signal to a controllable decimator to generate a decimated audio signal;
in response to said determination that first speech is present in the received audio signal, controlling the decimator such that the decimated audio signal has a predetermined sample rate; and
in response to said signal indicating that the first speech has ended in the received audio signal, controlling the decimator such that the decimated audio signal has said predetermined sample rate.

5. A method according to claim 1, further comprising:
receiving a signal indicating whether the first speech is present in the received audio signal.

6. A method according to claim 1, further comprising:
attempting to detect the first speech in the received audio signal.

7. A method according to claim 1, wherein the spoof detection circuit examines at least a component of said audio signal at frequencies higher than 8 kHz.

8. A method according to claim 1, further comprising, when no speech is detected in the received audio signal:
controlling the sampling rate of the analog-digital converter in the digital microphone such that the audio signal has a third sample rate lower than the second sample rate.

9. A method according to claim 4, further comprising, when no speech is detected in the received audio signal, controlling the decimator such that the decimated audio signal has said predetermined sample rate.

10. A method according to claim 9, further comprising:
when no speech is detected in the received audio signal, filtering said audio signal before application to the controllable decimator.

11. A method according to claim 8, wherein said third sample rate is in the range 50 kHz to 400 kHz.

12. A method according to claim 1, wherein said second sample rate is in the range 200 kHz to 1 MHz.

13. A method according to claim 1, wherein said first sample rate is in the range 1 MHz to 8 MHz.

14. A method according to claim 4, wherein said predetermined sample rate is in the range 10 kHz to 60 kHz.

15. An audio processing circuit, comprising:
an input for receiving an audio signal from a digital microphone, wherein the digital microphone comprises an analog-digital converter having a controllable sampling rate;
wherein the audio processing circuit is configured for:
in response to a determination that first speech is present in the received audio signal:

controlling the sampling rate of the analog-digital converter in the digital microphone such that the audio signal has a first sample rate; and
applying said audio signal to a spoof detection circuit; and
in response to a signal indicating that the first speech has ended in the received audio signal:
controlling the sampling rate of the analog-digital converter in the digital microphone such that the audio signal has a second sample rate lower than the first sample rate.

16. An audio processing circuit according to claim 15, further comprising:
a controllable decimator, for receiving the audio signal from said input to generate a decimated audio signal;
wherein the controllable decimator is controlled such that:
in response to said determination that first speech is present in the received audio signal, the decimated audio signal has a predetermined sample rate; and
in response to said signal indicating that the first speech has ended in the received audio signal, the decimated audio signal has said predetermined sample rate.

17. An audio processing circuit according to claim 15, wherein the spoof detection circuit examines at least a component of said audio signal at frequencies higher than 8 kHz.

18. An audio processing circuit according to claim 15, wherein the controllable decimator is controlled such that:
when no speech is detected in the received audio signal, the sampling rate of the analog-digital converter in the digital microphone is controlled such that the audio signal has a third sample rate lower than the second sample rate.

19. An audio processing circuit according to claim 18, wherein said third sample rate is in the range 50 kHz to 400 kHz.

20. An audio processing circuit according to claim 15, wherein said second sample rate is in the range 200 kHz to 1 MHz.

21. An audio processing circuit according to claim 15, wherein said first sample rate is in the range 1 MHz to 8 MHz.

22. An audio processing circuit according to claim 16, wherein said predetermined sample rate is in the range 10 kHz to 60 kHz.

23. A computer program product, comprising machine readable code containing instructions for causing an audio processing circuit to perform a method of operation of an audio system, the method comprising:
receiving an audio signal from a digital microphone, wherein the digital microphone comprises an analog-digital converter having a controllable sampling rate;
in response to a determination that first speech is present in the received audio signal:
controlling the sampling rate of the analog-digital converter in the digital microphone such that the audio signal has a first sample rate; and
applying said audio signal to a spoof detection circuit; and
in response to a signal indicating that the first speech has ended in the received audio signal:
controlling the sampling rate of the analog-digital converter in the digital microphone such that the audio signal has a second sample rate lower than the first sample rate.

* * * * *